S. C. & W. J. SNYDER.
S. C. SNYDER, ADMINISTRATOR OF W. J. SNYDER, DEC'D.
MORTISING MACHINE.
APPLICATION FILED AUG. 23, 1912.
1,112,336.
Patented Sept. 29, 1914.
3 SHEETS—SHEET 3.
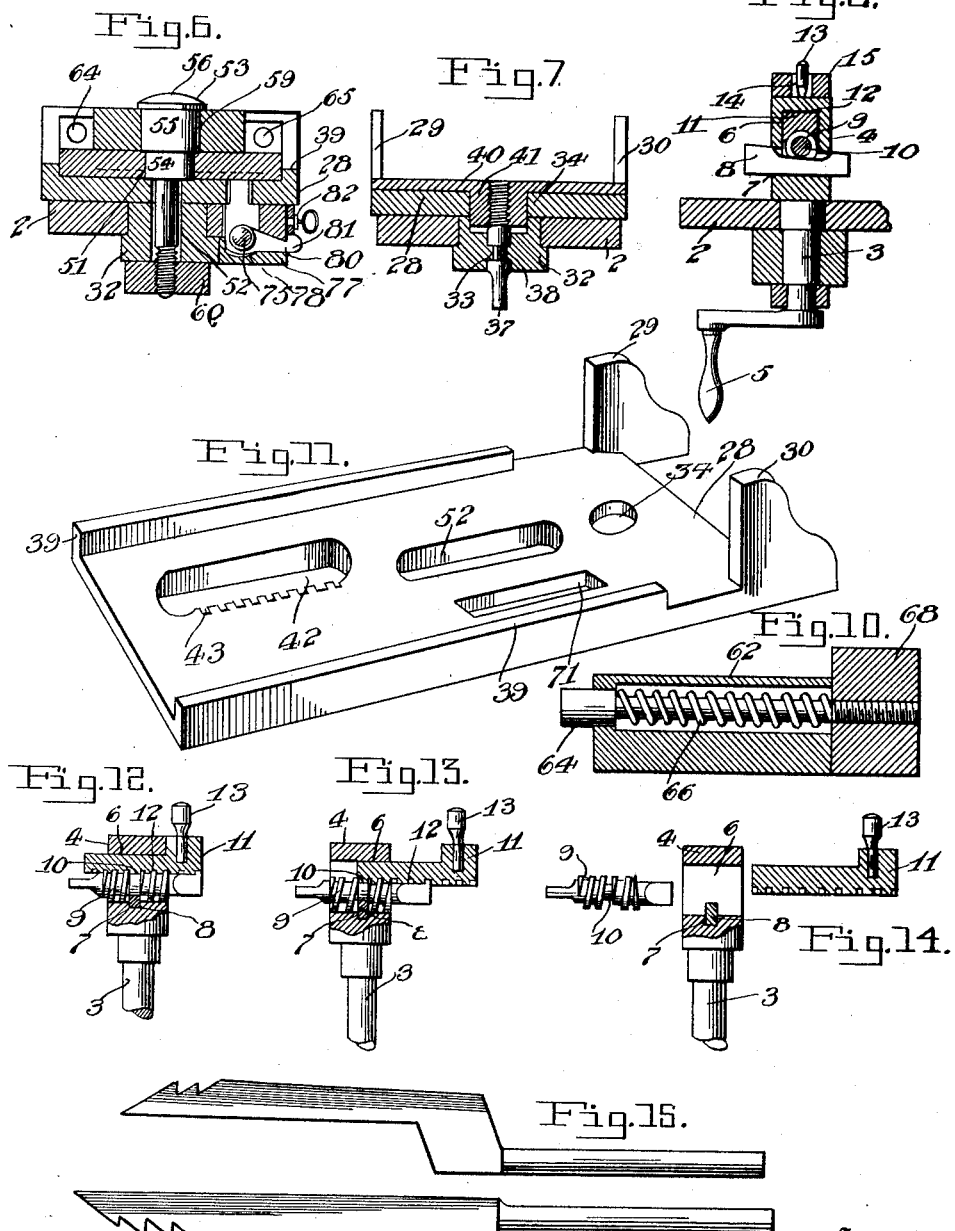

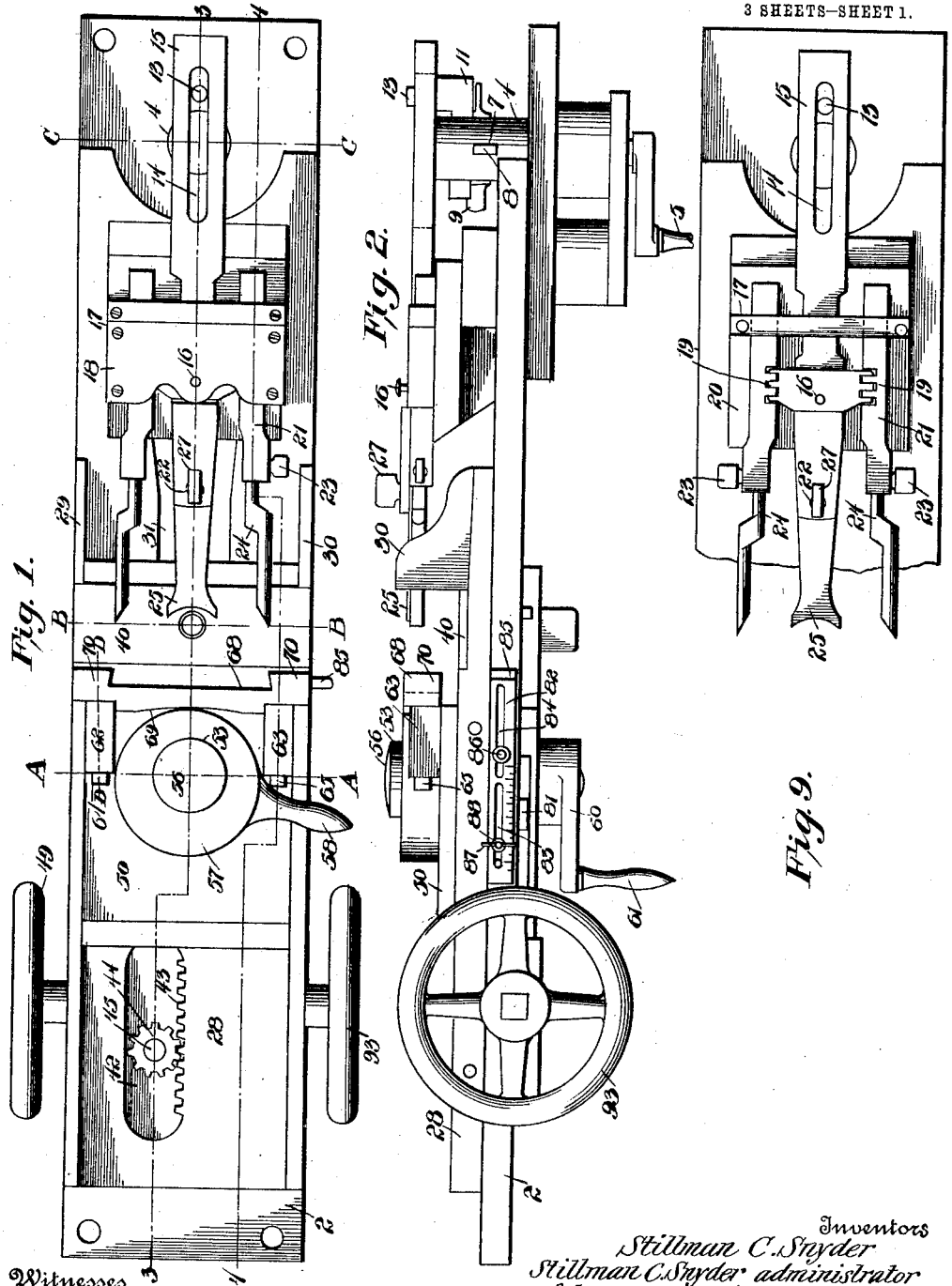

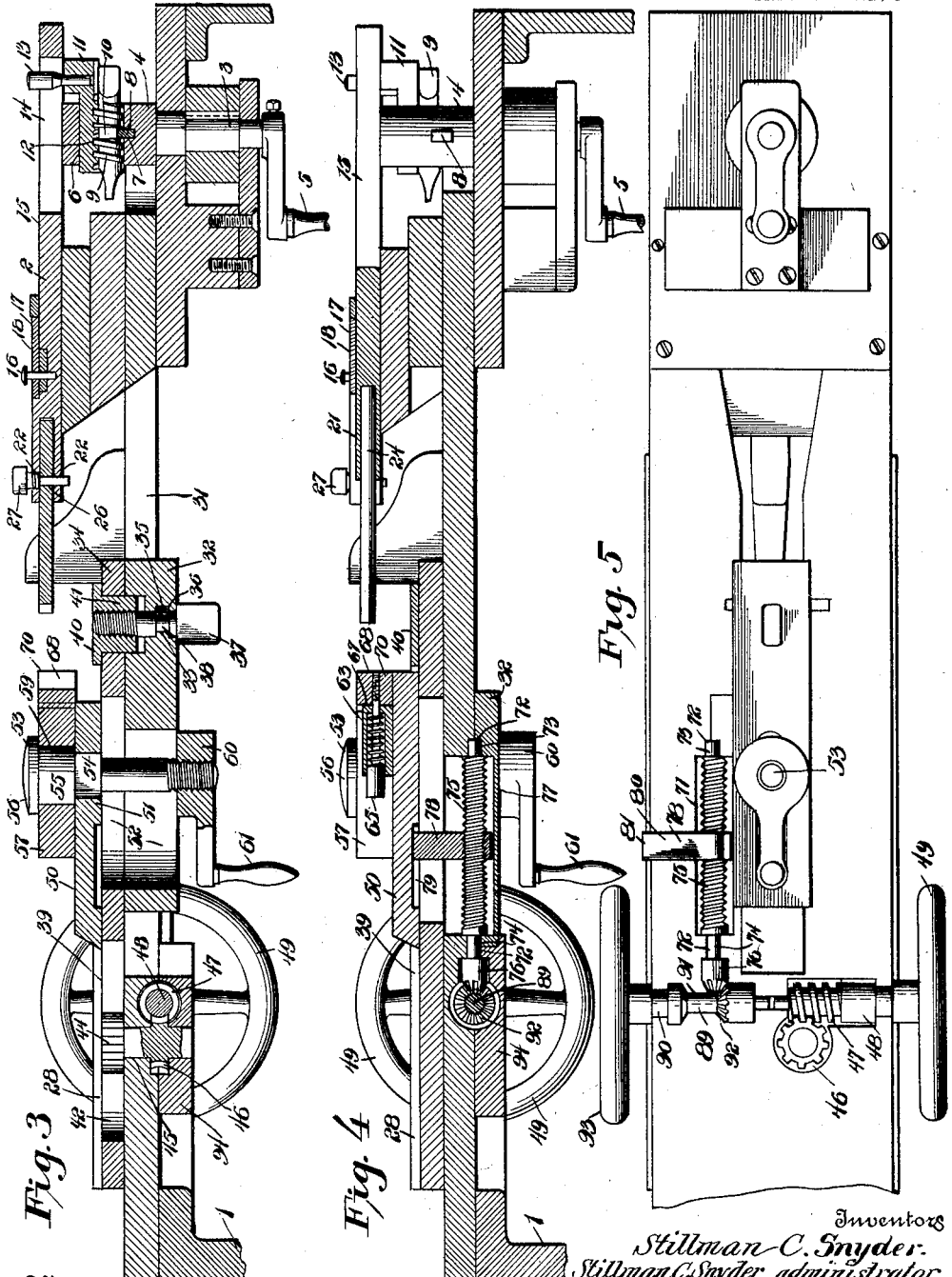

UNITED STATES PATENT OFFICE.

STILLMAN C. SNYDER, OF TAMARACK, NORTH CAROLINA, AND WILBURN J. SNYDER, DECEASED, BY STILLMAN C. SNYDER, ADMINISTRATOR, OF TAMARACK, NORTH CAROLINA.

MORTISING-MACHINE.

1,112,336.    Specification of Letters Patent.    Patented Sept. 29, 1914.

Application filed August 23, 1912. Serial No. 716,778.

*To all whom it may concern:*

Be it known that we, STILLMAN C. SNYDER, a citizen of the United States, residing at Tamarack, in the county of Watauga and State of North Carolina, and WILBURN J. SNYDER, late a citizen of the United States, (STILLMAN C. SNYDER administrator of the estate of WILBURN J. SNYDER, deceased,) have invented new and useful Improvements in Mortising-Machines, of which the following is a specification.

The present invention relates to mortising machines.

In carrying out the invention we propose to provide a mortising machine having spaced reciprocatory chisels and an intermediate cutting or gouging element with means for simultaneously operating all of the cutting elements.

A still further object of the invention is the provision of a housing or casing within which is arranged a reciprocatory and an oscillatory element, the said elements being so constructed and arranged as to receive removable chisels and a cutter, means being provided for simultaneously operating the said elements within the housing.

Again, we propose to provide a mortising machine with vertically adjustable rest plate for the work which is adapted to be positioned between the stops of a slidable feed plate and an adjustable pressure member provided upon the feed plate, the device being provided with oscillatory and reciprocatory cutting elements, and the said rest plate being devised to properly adjust the work so that the cutting elements may operate upon the said work at a desired point.

Another object of the invention is the provision of means whereby the movement of the work carrying members may be halted at a desired and predetermined distance from the cutting elements of the machine.

With the above recited objects in view, and others of a similar nature which will appear as the nature of the improvement progresses, the invention resides in the novel construction, combination and arrangement of parts set forth in the following description and falling within the scope of the appended claims.

In the drawings, Figure 1 is a top plan view of a mortising machine constructed in accordance with our invention. Fig. 2 is a side elevation of the same. Fig. 3 is a longitudinal sectional view upon the line 3—3 of Fig. 1. Fig. 4 is a similar sectional view upon the line 4—4 of Fig. 1. Fig. 5 is a bottom plan view, parts being removed. Fig. 6 is a transverse sectional view upon the line A—A of Fig. 1. Fig. 7 is a similar sectional view upon the line B—B of Fig. 1. Fig. 8 is a similar sectional view upon the line C—C of Fig. 1. Fig. 9 is a top plan view of a portion of the machine, the top or cap of the housing for the holders for the cutting elements being removed. Fig. 10 is a detail sectional view upon the line D—D of Fig. 1. Fig. 11 is a perspective view of the said plate. Figs. 12, 13 and 14 are details illustrating the manner of regulating the throw of the cutting elements, as well as the manner of removing the crank arm from the mandrel. Figs. 15 and 16 illustrate different forms of chisels which may be employed.

The machine is adapted to be secured to any suitable support which may be designated by the numeral 1.

The numeral 2 designates the bed plate for the machine, the same being of a substantially rectangular form and is provided adjacent its opposite ends with suitable openings for the reception of bolts whereby the said bed plate is retained upon the support 1. The bed plate 2 adjacent one of its ends is provided with a centrally arranged opening through which extends a shaft 3 having its upper portion formed with what we term a mandrel head 4, the lower extending portion of the said shaft being mounted in suitable bearings and being provided with suitable means for rotating the said shaft and handle, in the present instance, and for the sake of convenience a handle 5 has been illustrated as the medium whereby the shaft may be rotated, but it is to be understood, that the said shaft may be rotated from a suitable source of power in which instance a pulley or cog would be employed. The mandrel head 4 is provided with a transversely arranged elongated opening 6, the lower wall provided thereby being preferably rounded, while arranged transverse of the said elongated opening 6 and intersecting the lower rounded wall thereof, the mandrel is provided with a rectangular opening 7. This rectangular opening is adapted for the reception of a wedge member 8.

The numeral 9 designates a screw which is adapted to be arranged within the enlarged opening 6. The screw has its opposite ends provided with finger holds or heads, while the central portion of the screw is formed with an annular depression 10, the same adapted to be engaged by the transversely arranged wedge 8.

The numeral 11 designates the crank arm for the mandrel head. This crank arm has its lower face concaved and threaded as at 12, to coöperate with the threads of the screw 9.

The numeral 13 designates a removable pin which is connected with the free extremity of the crank arm. This pin is adapted to play within an elongated slot 14 provided in an operating arm 15, the said arm being pivoted as at 16 within a housing 17 which is provided with a removable cap or cover 18.

By arranging the crank arm and screw as just described, it will be apparent that the oscillatory movement of the arm 15, through the medium of the screw 9, may be regulated to a nicety, and furthermore that by removing the pin 13 from the crank arm 11 the screw may be rotated so as to entirely remove the crank arm from the mandrel head, and thus allow for the removal of the screw and wedge. These parts, however, are only removed from the mandrel head when any of the said parts have been injured and require replacing by similar parts.

The arm 15, at the opposite sides thereof, and approximately central of the pivot 16, is provided with extensions which have their ends formed with teeth 19, and these teeth are adapted to coöperate with similar teeth provided in movable stock members or sockets, designated by the numerals 20 and 21, respectively. These stocks or sockets are adapted to play within suitable bearings provided within the housing 17, and the said members project a suitable distance through the inner and open face of the said housing. The stock members are, of course, arranged adjacent the opposite sides of the arm 15, and the said arm has its portion projecting through the housing bifurcated to provide an upper and lower jaw, both of the said jaws having registering openings 22. The stock members or sockets have their projecting portions provided with adjustable securing elements, such as thumb screws 23, the same passing within the bore of each of the said sockets and adapted to contact with and retain therein the shanks of chisel members 24, while disposed between the bifurcated members of the operating arm 15 is a central cutting member 25. The chisel members may be constructed in various designs as illustrated in the several figures of the drawings, and the cutting elements may also be formed in any desired shape, it being essential, however, that the said cutting element will have its engaging face provided with at least two oppositely disposed sharpened edges, as clearly illustrated in the figures of the drawings. The transverse wall provided by the bifurcated extremity of the operating arm 15 is vertically straight, and the end of the cutting member 25 is also straightened, and is adapted to tightly contact with the said wall. The central or oscillating member 25 is provided with an opening 26, the said opening adapted to register with the openings 22 of the operating arm 15 when the said cutting member is positioned between the bifurcated extremity thereof, and the registering openings are adapted to receive a removable securing element, such as a pin 27. By reference to the drawings it will be noted that the housing 17 is elevated a suitable distance above the bed plate 2 so as to bring the cutting elements into proper register with the work to be operated upon, the said work being sustained in proper position through the medium of mechanism hereinafter to be described.

By an arrangement as above set forth it will be noted that the chisel members, when the shaft 3 is rotated, are given an intermittent reciprocatory movement, while the cutting member 25 is oscillated simultaneously with and between the said chisels, so that it will be apparent that a mortise may be made within the work within a minimum amount of time and at a minimum amount of power. It will be further noted that by providing the mandrel head with the adjustable crank arm the throw of the cutting elements, with relation to their work, may be readily regulated.

The numeral 28 designates a sliding feed plate which is arranged upon the bed plate 2 opposite the housing 17. This feed plate is of a width approximately corresponding with the width of the bed plate 2, and has its inner end, or that adjacent the cutting elements, provided upon its opposite edges with upset stop members 29 and 30, the same being arranged, of course, opposite the sides of the housing 17, so as not to interfere with the chisels or work upon which the chisels operate. The bed plate 2 is provided with a centrally arranged elongated opening 31, while secured to the under face of the sliding feed plate 28 is a flanged guide plate 32, the said plate passing through the opening 31 and having its flanges engaging with the under face of the bed plate 2 opposite the walls provided by the said opening. The guide plate 32 is provided with an annular opening 33 which intersects an enlarged annular opening 34 provided both in the feed plate and in the upper portion of the guide plate. These openings are arranged directly to the rear of the stops 29 and 30 and central of the plates 28 and 32. The flanged portion of the guide plate, which extends below the under face of the bed plate, is provided with a transversely arranged wedge-shaped slot 35, which is adapted for the reception of a wedge key 36, the said key having one of its portions passing through the annular opening 33. The numeral 37 designates a headed member, the said screw being provided with an annular depression 38 which is adapted to receive the portion of the wedge key passing through the opening 33, and whereby the said screw, while being free to rotate within the openings 33 and 34 cannot be accidentally removed.

The feed plate 28 has its longitudinal sides flanged as at 39, the said flanges being parallel with the stops 29 and 30, and these flanges, are depressed for a suitable distance away from the said stops to provide for the reception of a substantially rectangular rest plate 40. The rest plate 40 has its under face provided with a depending sleeve or boss 41, the bore of which being threaded, and this sleeve is adapted to be received within the enlarged opening 34, and the screw 37 coöperates with the threaded bore thereof. It may here be stated that the rest plate is adapted to contact with the vertically straight walls provided by the stops 29 and 30, and it will be readily noted that by rotating the headed screw 37, the rest plate may be raised or lowered to bring the work, which is adapted to be positioned upon the said rest plate, to a desired position with relation to the cutting elements.

The feed plate 28 is provided adjacent what may be termed its rear end with an elongated slot or opening 42, the end walls of which are preferably rounded. One of the longitudinal walls provided by the opening 42 is formed with teeth 43, with which mesh a toothed wheel 44, the same being mounted upon a suitable shaft 45 which extends through the feed plate 28, and is provided with a smaller toothed wheel 46. This toothed wheel 46 is adapted to mesh with a worm 47 provided upon a shaft 48 which is mounted in suitable bearings upon the under face of the bed plate 2 and which is arranged transversely of the said bed plate and projects a suitable distance to one side of the said bed plate. This projecting portion of the shaft is provided with a hand wheel 49, whereby the said shaft may be rotated to cause the toothed wheel 44 to be revolved and to move the feed plate 28 as well as the rest plate 40 toward or away from the cutting elements, as desired.

Arranged upon the feed plate 28 and guided by the flanges thereof is what we term a lock carrying plate for the work press or work holding member. This plate is designated by the numeral 50 and the said plate is provided with a substantially rectangular opening 51 which is positioned directly above the elongated longitudinaly extending openings 52 provided in both the feed and guide plates. The numeral 53 designates a screw member which is adapted to pass through the said openings. The screw is provided with a rectangular portion 54 which is adapted to be received within the rectangular opening 53 of the plate 50, to prevent the rotation of the said bolt. The bolt is further provided with a rounded portion 55 which is arranged directly above the rectangular portion, and the said bolt is further provided with a head 56.

The numeral 57 designates a rounded lock member which is provided with a handle 58. This lock 57 has an eccentrically arranged annular opening 59 through which the rounded portion 55 of the screw 53 passes, while the head 56 of the screw contacts with the upper face of the said lock. The portion of the screw 53 extending through the opening 51 is engaged by a nut 60, the same being provided with a suitable off-set operating handle 61. By such an arrangement it will be noted that by loosening the nut 60 the plate 50 may be free to slide upon the plate 28 either toward or away from the stops 29 and 30 and from the cutting elements of the device.

Arranged upon the opposite longitudinal edges of the plate 50 and at the forward end thereof are housings 62 and 63, the same having their opposite transverse walls provided with rounded openings, and passing through the said openings are pins 64 and 65. Each of these pins is provided upon its rear end with an enlargement, and surrounding the reduced portions of the pins and exerting a tension between the inner wall of each of the housings and the enlarged portions of each of the pins are helical springs 66 and 67. Connected with the reduced portions of the pins is what may be termed a work holder or press member 68, the same having its inner face rounded as at 69, the said rounded portion being normally contacted by the cam lock 57. The work holder 68 preferably has its inner face adjacent its opposite ends enlarged as at 70, the enlargements being threaded directly forward of the connection of the holder with the pins 64 and 65 so that the cam lock engaging with the intermediate and reduced portion of the holder will cause the enlarged portions thereof to evenly and tightly contact with the work. The bed plate as well as the feed plate are further provided with elongated registering longitudinally extending openings 71, the said openings being arranged to one side of the opening 52, and the under face of the bed plate adjacent the transverse walls provided by the said opening 71 is formed with substantially semi-cylindrical bearings 72. These bearings are adapted to receive the annular reduced portions 73 and 74 provided upon a threaded bolt 75. One end of this bolt is formed with a beveled toothed head 76 which is arranged within a suitable depression also provided upon the under face of the bed plate. The numeral 77 designates a cap which is also provided with semi-cylindrical bearings for the reduced portions 73 and 74, of the bolt 75, and which is adapted to close the openings 71 and shield the bolt 75. Arranged upon the bolt 75 is a traveler 78, the same passing through the openings 71 and engaging within an elongated depression 79 provided upon the under face of the plate 50. The traveler is further provided with an angularly arranged arm 80 which has its extremity provided with a lip 81, the said lip engaging with the longitudinal edge of the bed plate 2. The numeral 82 designates a sliding gage which is positioned upon this side of the bed plate, the said gage being provided with suitable graduating marks. The gage comprises a rectangular member having a pair of elongated longitudinally extending slots 83 and 84, while one end of the said gage is provided with an offset portion forming a finger hold 85, passing through the slot 83 and engaging within a suitable threaded opening in the side of the bed plate 2 is a headed threaded member 86, the same being preferably provided with a suitable washer which bears against the gage, while passing through the second slot 84 of the said gage and engaging within a suitable threaded opening in the bed plate is the threaded extremity of a button 87, this button is provided with a suitable flange 88 which is adapted to bear against the gage to retain the said gage in a desired adjusted position.

The numeral 89 designates a shaft which is arranged transversely of the bolt 75, the said shaft being provided with annular reduced portions 90 and 91 which engage in suitable semi-cylindrical bearings provided in the under face of the bed plate. The shaft is further provided with an enlargement having a beveled toothed face 92, the teeth thereof adapted to mesh with the beveled teeth 76 provided upon the bolt 75. The shaft 89 is adapted to extend beyond the side of the bed plate, and the said extension is provided with a hand wheel 93 whereby the said shaft may be rotated.

The numeral 94 designates a suitable cap which has its inner face provided with bearings for the reduced portions of the shaft 89, as well as depressions forming bearings for the depending portion for the shaft 45, as well as for the shaft 48.

It is to be understood that the work to be operated upon by the cutting element is adapted to rest upon the plate 40 and to be clamped by the holder 68 between the said holder and the stops 29 and 30. It will be readily noted that the said work may be of any desired width and thickness, that the depth of the cut may be regulated by adjusting the crank arm 11 without necessitating an accurate adjustment of the plate 28, that the width of the work is taken care of by the sliding plate 50, and that when a minute adjustment of the work with relation to the cutting elements is desired the bolt 75 is rotated, through the medium of the shaft 89 which will move the traveler 78, causing the same to slide the plate 50 to bring the lip 81 into proper register with one of the designating marks or characters 82′ upon the gage 82. It will be further noted that by sliding the gage 82 the traveler may be brought into engagement with either of the transverse walls provided by the elongated depressions 79 in the plate 50, and from the above description, taken in connection with the accompanying drawing, it is thought that the advantages and operation of the machine will be perfectly apparent to those skilled in the art to which such inventions appertain without further detailed description.

Having thus described the invention, what we claim is:—

1. In a machine of the class set forth, in combination, a support, cutting elements, means for operating the cutting elements, a bed plate upon the support, a feed plate mounted upon the bed and having its ends upset to provide stop members which are disposed to the opposite sides of the cutting elements, a vertically adjustable work rest arranged upon the feed plate, and a longitudinally adjustable work holder carried by the feed plate and arranged to the rear of its stop shoulders and the vertically adjustable work support.

2. In a machine of the class described, in combination, cutting elements, means for operating the cutting elements, a bed plate, a feed plate upon the bed plate, means for longitudinally moving the feed plate upon the bed plate, means for limiting the movement of the feed plate upon the bed plate, the bed plate having one of its ends provided with upset members forming stops which are disposed to the opposite sides of the cutting elements, a vertically adjustable work support arranged adjacent the stop members, a work holder disposed to the rear of the support, and means for adjusting the work holder toward or away from the cutting elements.

3. In a mortising machine, a support, a bed plate upon the support, cutting elements, means for simultaneously operating the cutting elements, a slidable feed plate upon the bed plate, stop members integrally formed with the feed plate and disposed to the opposite sides of the cutting elements, a work holder upon the feed plate, springs for retaining the work holder in one position, and a cam member adapted to centrally engage with the work holder to force the same against the tension of the springs toward the cutting elements.

4. In a mortising machine, cutting elements, means for operating the cutting elements, a bed plate, a feed plate upon the bed plate, a guide for the feed plate, stops upon the feed plate, a vertically adjustable work support carried by the feed plate, a slidable plate arranged upon the feed plate, a lock for the said slidable plate, said lock including a cam, housings upon the plate, spring pressed pins within the housings, a holder connected with the pins and said holder having its inner faces rounded and adapted to engage the cam member of the lock substantially as and for the purpose set forth.

5. In a mortising machine, a bed plate, cutting elements, means for operating the cutting elements, the bed plate being provided with an elongated opening, a feed plate upon the bed plate, a flanged guide plate passing through the opening of the bed plate, and connected with the feed plate, stops upon the feed plate, a work rest arranged upon the feed plate and positioned adjacent the stops, a screw for raising or lowering the rest plate, the feed plate being provided with an elongated opening, one of the walls of which being provided with teeth, a toothed wheel meshing with the said teeth, a shaft for the toothed wheel, a smaller toothed wheel upon the shaft and arranged below the bed plate, a transverse shaft provided with a worm intermeshing with the said smaller toothed wheel, a hand wheel for this shaft, and an adjustable work holder arranged above the feed plate.

6. A mortising machine including a bed plate provided with a plurality of cutting elements, and means for simultaneously operating all of the cutting elements, a longitudinally movable feed plate upon the bed plate, stops upon the feed plate, a vertically adjustable work rest upon the feed plate, and arranged adjacent the stops, said feed plate having its longitudinal sides flanged, a plate arranged between the flanges and movable upon the feed plate, a lock for this plate, a work holder carried by the plate, the feed plate and bed plate being provided with elongated registering openings, the plate carried by the feed plate having a depression, a bolt mounted in bearings and arranged within the opening of the bed plate, a follower carried by the bolt and arranged within the depression provided by the plate carrying the work holder, said follower being provided with an offset portion having a lip arranged upon one of the sides of the bed plate, a slidable gage upon the bed plate, the bolt having one of its ends provided with beveled teeth, a transversely arranged shaft mounted in bearings upon the under face of the bed plate and being provided with a beveled toothed portion engaging with the beveled teeth of the bolt, and said shaft being provided with a hand wheel arranged upon one of the sides of the bed plate.

In testimony whereof we affix our signatures in presence of two witnesses.

STILLMAN C. SNYDER,
STILLMAN C. SNYDER,
*Administrator of the estate of W. J. Snyder, deceased.*

Witnesses:
J. M. SOUTH,
B. R. SOUTH.